United States Patent
Costa

(10) Patent No.: US 8,549,485 B2
(45) Date of Patent: Oct. 1, 2013

(54) METHOD AND SYSTEM FOR CONCISE EXPRESSION OF OPTIONAL CODE SNIPPETS IN INTERREPTED LANGUAGES

(75) Inventor: Glauber de Oliveira Costa, SP (BR)

(73) Assignee: Red Hat, Inc., Raleigh, NC (US)

( * ) Notice: Subject to any disclaimer, the term of this patent is extended or adjusted under 35 U.S.C. 154(b) by 313 days.

(21) Appl. No.: 13/113,005

(22) Filed: May 20, 2011

(65) Prior Publication Data

US 2012/0297369 A1   Nov. 22, 2012

(51) Int. Cl.
   *G06F 9/44* (2006.01)
(52) U.S. Cl.
   USPC ............................................. 717/126
(58) Field of Classification Search
   USPC .................................. 717/126–128
   See application file for complete search history.

(56) References Cited

U.S. PATENT DOCUMENTS

| | | | | |
|---|---|---|---|---|
| 2006/0129605 A1* | 6/2006 | Doshi | ...................... | 707/104.1 |
| 2007/0174812 A1* | 7/2007 | Yang | ............................. | 717/114 |
| 2007/0192367 A1* | 8/2007 | Choudhary et al. | ........ | 707/104.1 |
| 2008/0168020 A1* | 7/2008 | D'Ambrosio | ................... | 706/50 |
| 2009/0037874 A1* | 2/2009 | Gupta et al. | .................. | 717/105 |
| 2009/0144759 A1* | 6/2009 | Hon et al. | ..................... | 719/330 |

OTHER PUBLICATIONS

Qi et al. "sharing Classes Between Families" Dublin Ireland Jun. 15-20, 2009, ACM 2009 pp. 281-292.*

* cited by examiner

*Primary Examiner* — Anna Deng
(74) *Attorney, Agent, or Firm* — Lowenstein Sandler LLP

(57) ABSTRACT

A method and apparatus for the concise expression of optional code snippets in interpreted object-oriented programming language software applications is described. In one embodiment, the method includes defining a first class where the first class is a concise expression class that includes one or more objects. The method may also include including the concise expression class in a second class that includes one or more objects of the second class. The method may also include executing an expression in a software application to evaluate an object of the second class and returning an instance of an object of the concise expression class when data associated with the object of the second class does not exist within the software application.

18 Claims, 5 Drawing Sheets

METHOD AND SYSTEM FOR CONCISE EXPRESSION OF OPTIONAL CODE SNIPPETS IN INTERREPTED LANGUAGES

TECHNICAL FIELD

Embodiments of the invention relate to the field of software application development, and more particularly, to enabling the concise expression of optional code snippets in interpreted object-oriented programming language software applications.

BACKGROUND

Software application programmers often write code that is intended to be used in some other location of a program. In the case of a code library, the code may be intended for use in another program entirely. In order to ensure that this code runs properly, the software applications programmers must ensure that all the data and functions required by the code exist. This is usually done by testing some data structure associated with the code in question, such as a simple variable indicating that the required data does or does not exist. Every use of the code, at some level, has to do this testing which leads to a longer and more complicated way of expressing and using the code.

In compiled languages, pre-processors exist that can do this testing before code is executed or included in compiled code. In a compiled language application, when a pre-processor macro is defined, a test may be embedded in the pre-processor macro definition. Then when the pre-processor macro is used in a software application, the pre-processor macro may simply be called and tested by the pre-processor. In other programming languages, such as interpreted computer programming languages, there is no pre-processor and handling the situation where a function, object, method, data structure, etc. may or may not exist, becomes very confusing.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for the concise expression of optional code snippets in interpreted object-oriented programming language software applications is described. In one embodiment, the method includes defining a first class where the first class is a concise expression class that includes one or more objects. The method may also include including the concise expression class in a second class that includes one or more objects of the second class. The method may also include executing an expression in a software application to evaluate an object of the second class and returning an instance of an object of the concise expression class when data associated with the object of the second class does not exist within the software application.

Figure 1:
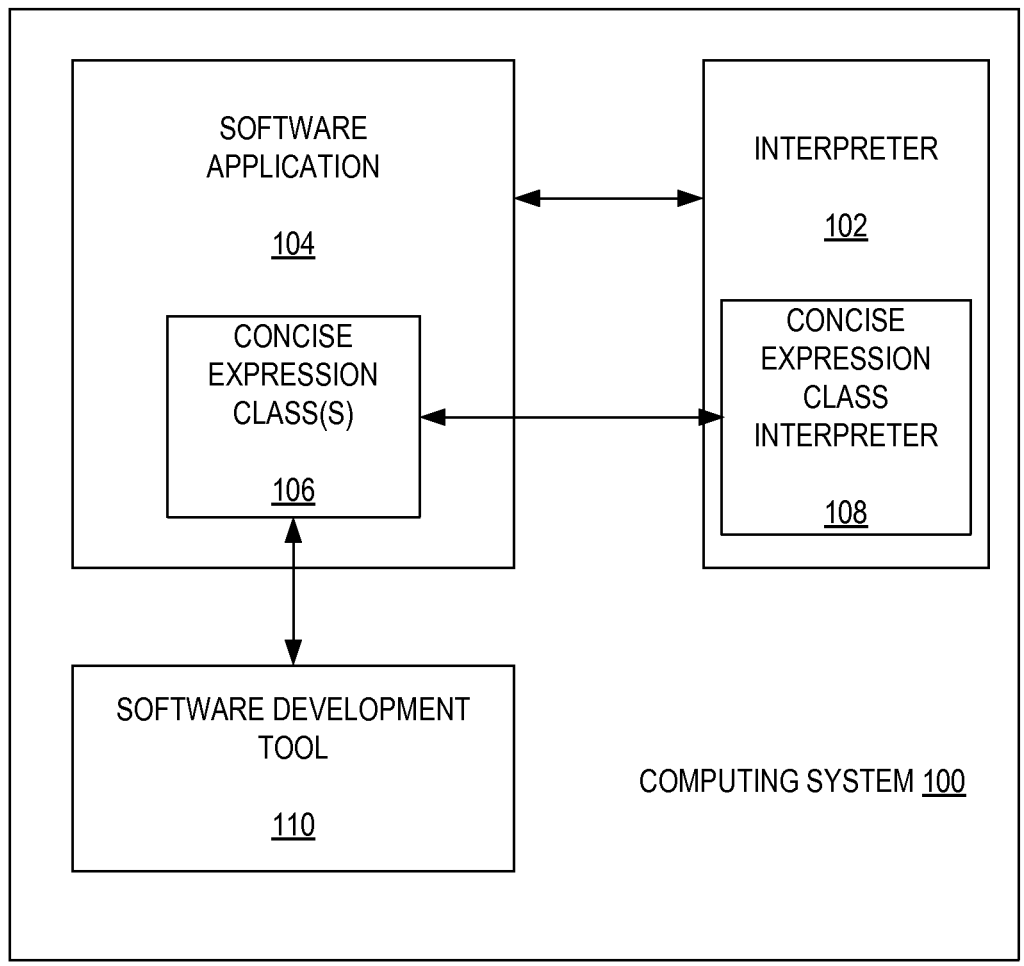
FIG. 1 is a block diagram of one embodiment of a system for enabling the concise expression of optional code snippets in interpreted object-oriented programming language software applications.

FIG. 1 is a block diagram of one embodiment of a computing system 100 for enabling the concise expression of optional code snippets in interpreted object-oriented programming language software applications. In one embodiment, the computing system 100 includes an interpreter 102, a software application 104, one or more concise expression classes 106, concise expression class interpreter 108, and software development tool 110. Although one software application is shown, in one embodiment, computing system 100 may run several software applications via interpreter 102 that utilize the concise expression classes 106 as discussed herein.

In one embodiment, computing system 100 is a programmable machine that is capable of receiving input, storing and manipulating data, and providing output. In one embodiment, computing system 100 may be any of a desktop computer, server computer, laptop computer, tablet computer, palmtop computer, smart phone, electronic reader, etc. In one embodiment, computing system 100 may be coupled with other computing systems (not shown) over a network.

In one embodiment, computing system 100 includes interpreter 102. Interpreter 102 includes computer programs that execute a software application written in a programming language, such as an object-oriented programming language. In one embodiment, interpreter 102 executes the source code directly, or translates source code into an intermediate representation and then immediately executes the intermediate representation. In one embodiment, interpreter 102 may be an interpreter based on PYTHON™, PERL™, RUBY™, as well as any other interpreter for executing software applications.

In one embodiment, computing system 100 also includes software application 104. In one embodiment, software application 104 is a computer program for receiving data, processing data, providing output, etc. In one embodiment, software application 104 is a computer program written in an object-oriented programming language such as PYTHON™, although other programming languages such as PERL™, RUBY™, etc. may be utilized as discussed herein. Software application 104 may include instructions, expressions, data structures, classes, libraries, as well as other elements of a computer program.

In one embodiment, software application 104 is written or edited by a user with software development tool 110. In one embodiment, software development tool 110 provides a user interface for writing, editing, debugging, and testing software applications, such as software application 104. In one embodiment, software development tool 110 further provides an interface that enables users to create concise expression classes 106

As discussed above, interpreter 102 reads the contents of software application 104 and immediately executes the instructions within the programming code of software application 104. In one embodiment, a piece of code within software application 104 may attempt to use code in some other location of the software application 104 (or in another program, in the case of a code library). One problem exists in that the code sought to be used by the interpreter 102 may or may not exist, may or may not have been instantiated, or may be otherwise unavailable. Furthermore, because software application 104 is an interpreted language application, there is no pre-processor to check whether all components of the program exist prior to run-time.

For example, consider the following PYTHON™ class:

```
class A:
    self___init___(self, i)
        if i == 0:
            self.obj1 = Obj1(i)
        else:
            self.obj2 = Obj2(i)
```

In exemplary class A, Obj1 and Obj2 can be two radically different objects, with different methods. In this case, the existence or absence of a particular object or attribute within class A becomes difficult to test, especially if attempting to utilize the same test code. At some later point in a software application, there might exist a user of an object 'a' of class A, which wants to use obj1's method 'method1'. However, the method is not guaranteed to exist. A conventional use of the 'method1' would include a test to determine whether the method exists within the software application prior to execution of the method, such as:

```
try:
    x = a.obj1.method(1)
except NameError:
    x = None         # or do nothing else
```

Alternatively, without relying on the try/except construct, a software application could test to determine whether the method exists by:

```
if "obj1" in dir(a):
    x = a.obj1.method1( )
else:
    x = None # or do nothing else
```

As illustrated above, "'obj1' in dir(a)" is utilized to access a list of all methods and attributes of an object. For interpreted languages other than PYTHON™, the testing can utilize any self-reflexive attribute discovery construct provided by the programming language.

In one embodiment, instead of utilizing test code, such as the try/except and the discovery constructs discussed above, a pattern technique may be used with the concise expression classes 106 for interpreted language expressions. In one embodiment, the concise expression classes 106 are created based on user input received by software development tool 110. By creating and using the concise expression classes 106, a programmer may write code to access objects, and be assured that non-existent objects will not be executed, as:

```
x = a.obj1.subobj1.subsubobj1.method1( )
```

Figure 2:
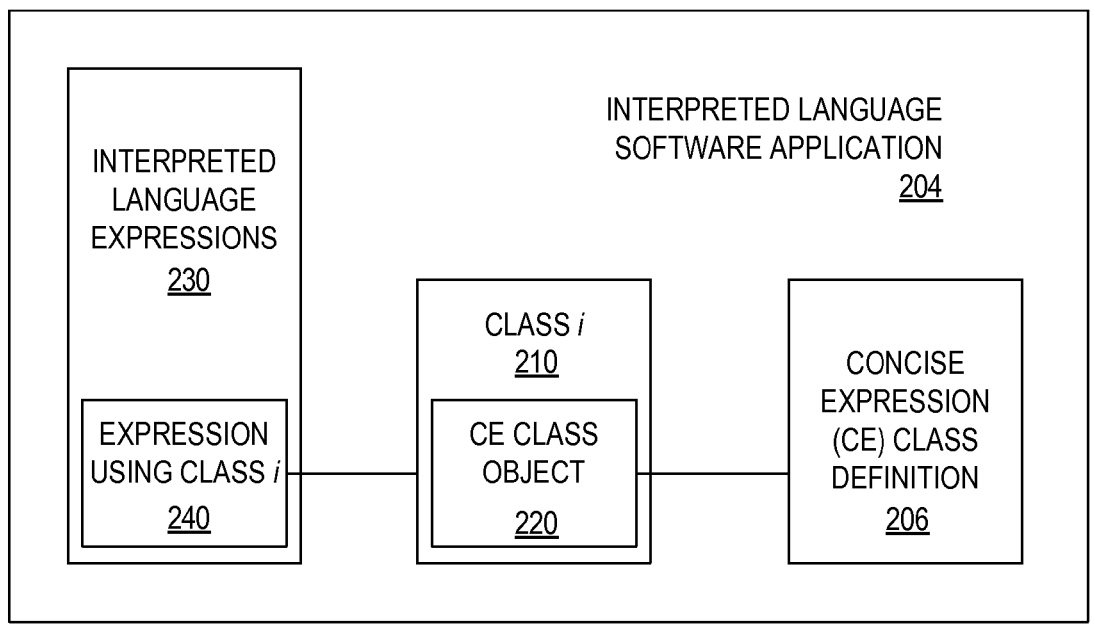
FIG. 2 is a block diagram that illustrates the inclusion of a concise expression class in an interpreted language software application.

In one embodiment, concise expression classes 106 are a set of one or more classes created from user input using software development tool 110 that include all attributes that may or may not exists inside an object or function. FIG. 2 is a block diagram that illustrates the inclusion of a concise expression class 206 in an interpreted language software application 204. In one embodiment, concise expression class 206 is defined within interpreted language software application 204. In another embodiment, concise expression class 206 is a class defined outside of interpreted language software application 204, but included within the interpreted language software application 204. Class i 210 includes a CE class object 206 within the class. When program code that includes a plurality of expressions 230, including an expression 240 that utilize the data, method calls, functions, etc. of class i 210, is executed by an interpreter (e.g., Interpreter 102 of FIG. 1), CE class object 220 ensures that the expression will be evaluated. As will be discussed in greater detail below, even when data or an object to be accessed by expression 240 does not exist, CE class object 220 ensures that an object with the same properties as the non-existent object are returned by the expression. By returning an object, the expression is permitted to be executed without crashing the interpreted language software application 204.

As discussed in greater detail below, when an interpreter, such as interpreter 102, attempts to access an expression with an object that includes a concise expression class 106, concise expression class interpreter 108 of interpreter 106 expands the attribute chain of the expression until the chain ends and executes the correct action as specified by the expression. Otherwise, concise expression class interpreter 108 simply does nothing if one of the objects in the chain does not exist. By enabling a programmer to utilize the simple and concise expression when writing and editing software applications, rather than requiring the programmer to include various testing constructs whenever an expression is used, the resulting software application is made much clearer for a human to read, and easier for an interpreter to translate.

In one embodiment, concise expression classes 106, as well as CE class 206 discussed above, exploit operator overloading in order to return an instance of a CE class when data in an expression does not exist. Object oriented languages, such as PYTHON™, PERL™, etc., allow for operator overloading. Operator overloading enables a standard operation such as the dot operator (e.g., "." operator) to be given a special, class-specific meaning. In one embodiment, the concise expression classes 106 are special class that overloads the '.' operator to achieve a described behavior when included within elements accessed by an expression and executed by concise expression class interpreter 108 of the interpreter 102. Namely, the described behavior is to allow an expression to be executed normally when all components, classes, functions, data structures, etc. accessed by the expression exist at run time. However, when one of the elements accessed by the expression does not exist, as discussed below, instead of causing an error in the software application, the concise expression returns an instance of itself to the expression and indicates that no action should be taken. A normal function does not provide the functionality of a function based on a concise expression class. That is, the results of a normal function can be used directly, but a next level of the function would need to be tested to ensure that the elements accessed by the function exist. As an example, a function could be used that substitutes "a.obj1" for func1( ). But then another function would be needed to access a.obj.subobj1, and so on. Since the state of a program is not known until runtime, the necessary number of test function can easily get very large.

In one embodiment, an exemplary implementation of a concise expression class that returns an instance of itself is provided below. In one embodiment, the concise expression class is written in PYTHON™, although any suitable interpreted language may also be utilized. A set of attributes is defined outside of the concise expression class, and then a concise expression class, named "Optional", is also defined:

```
attr_list = { }
class Optional:
    def __call__(self):
        return None
    def __getattr__(self, attr):
        try:
            return attr_list[attr]
        except KeyError:
            return Optional( )
    def __setattr__(self, attr, value):
        attr_list[attr] = value
```

The set of attributes is not defined inside of the concise expression class because such an arrangement would cause an endless recursion when trying to access the attributes. For example, an attempt to access self.attr_list would also call _getattr_( ) that would search for self.attr_list, that would again call _getattr_( ) and so on in an endless loop.

In one embodiment, all attributes that may or may not exist inside an object of the class Optional are included in the class. In the Optional class above, a function call, as defined by def _call_(self) would return nothing. The Optional class further defines custom actions for the default _getattr_ and _setattr_ PYTHON™ methods.

For example, _getattr_ is a method for reading data in PYTHON™ that is redefined By Optional. The redefined _getattr_, when called, first attempts to return the needed data. When the data exists, the data is returned normally. However, when the _getattr_ method attempts to access data that does not exist, an Optional class object is returned with the same property as the object attempted to be accessed by the _getattr_ method call. That is, a void object with the same properties is returned in order to prevent an error from occurring when attempting to access a nonexistent object. The void object will, however, return objects in the non-existent attribute path since the call chain was broken when trying to access the non-existent data.

An example class definition, which utilizes the concise expression class "Optional" would then be:

```
class A:
    self __init__(self, i)
        self.opt = Optional( )
        if i == 0:
            self.opt.obj1 = Obj1(i)
        else:
            self.opt.obj2 = Obj2(i)
```

In a software application, such as software application 104, program code could include the expression:

```
x = a.opt.obj1.subobj1.subsubobj1.method1( )
```

The expression expands utilizing the concise expression "Optional" class. When a.opt does not have obj1, an Optional( ) object is returned. When the Optional( ) object does not have anything, including subobj1, then a.opt.obj1.subobj1 returns another Optional( ) object, and so on until the expression has been fully evaluated. That is, when an object that is to be accessed by an expression does not exists, the concise expression class returns an instance of an object in the concise expression class with a corresponding object return type. However, since the intended object does not exist, the return of the object from the concise expression class ensures that the software application does not crash or otherwise encounter a fatal error.

Figure 3:
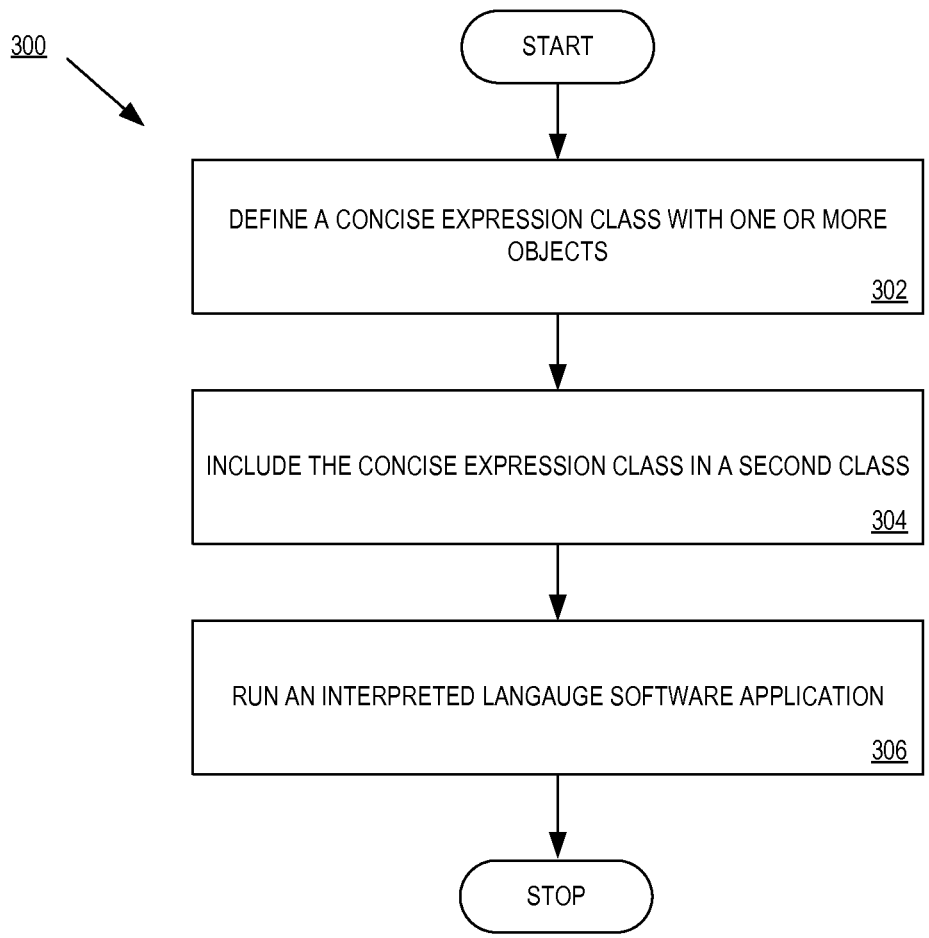
FIG. 3 is a flow diagram of one embodiment of a method for enabling a concise expression class in an interpreted language software application.

FIG. 3 is a flow diagram of one embodiment of a method 300 for enabling a concise expression class in an interpreted language software application. The method 300 is performed by processing logic that may comprise hardware (circuitry, dedicated logic, etc.), software (such as is run on a general purpose computer system or a dedicated machine), firmware, or a combination. In one embodiment, the method 300 is performed by software development tool 110 and software application 104 of computing system 100 of FIG. 1.

Referring to FIG. 3, the process begins by processing logic defining a concise expression class within one or more objects based on user input (processing block 302). In one embodiment, the user input is received by a software development tool, such as software development tool 110 of FIG. 1. In one embodiment, the concise expression class includes a class-specific meaning for an overloaded operator, such as the "." operator. In one embodiment, interpreted language methods or function calls may also be redefined to return instances of the concise expression class when use of the methods or function calls would access data or objects that do not exist. Furthermore, the return values may also be defined to coincide with the method calls, so that that returned instances of the concise expression class, when data does not exist, conform to the attributes of the original method or function call.

Processing logic then includes the concise expression class in a second class (processing block 304). At processing block 306, processing logic receives a user request to run an interpreted language software application (processing block 306). In one embodiment, the concise expression class is included in the second class to enable methods, functions, and data accesses by object of the second class to be utilized without the inclusion of test code. As discussed above, in an interpreted language software application, expressions that make up the software application access methods, functions, and data, which may or may not exist. Instead of requiring that all method calls, for example, are accompanied by test code to determine if an object exists, the expression may be included without the test code, as the use of the concise expression will return a useful object (i.e., an instance of the concise expression with corresponding attributes) rather than an error message.

Figure 4:
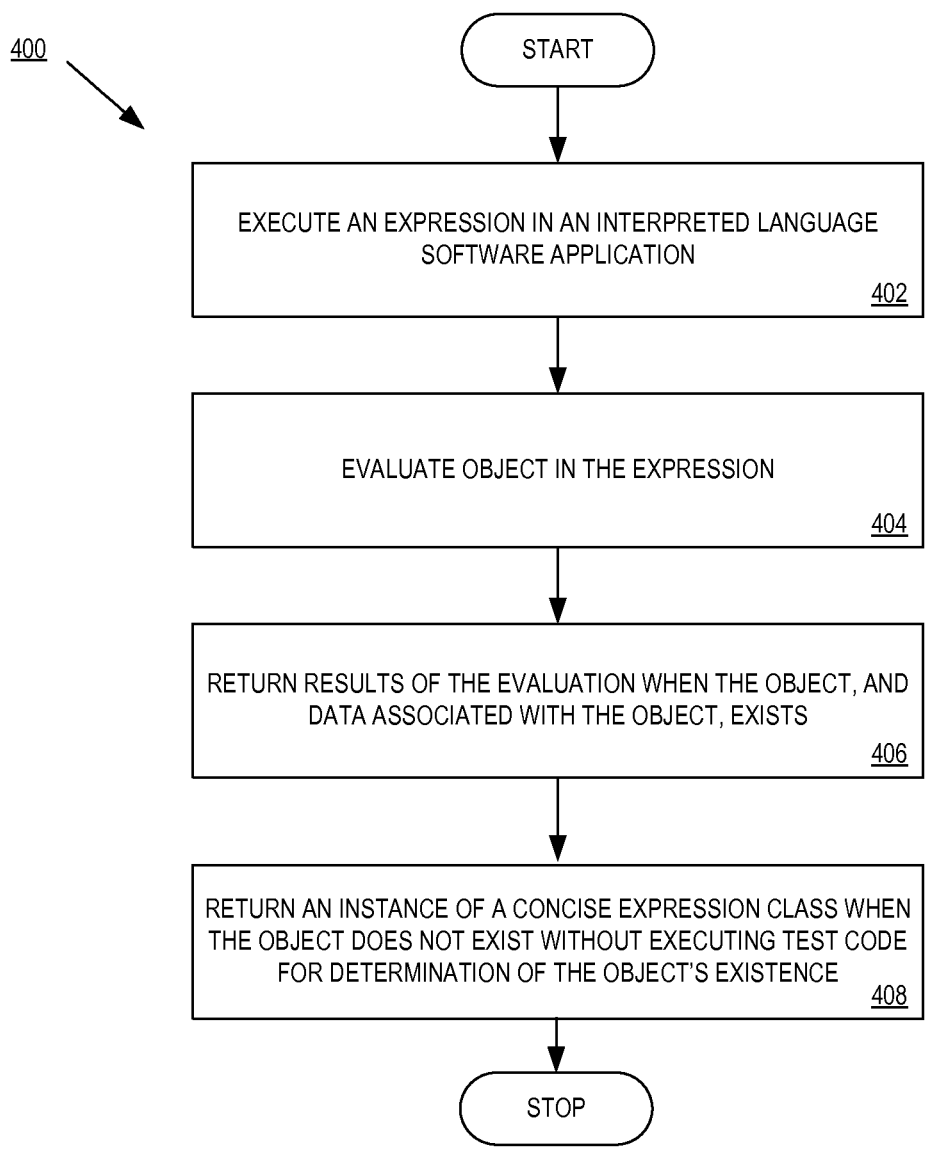
FIG. 4 is a flow diagram of one embodiment of a method for executing expressions in an interpreted language software application.

FIG. 4 is a flow diagram of one embodiment of a method 400 for executing expressions in an interpreted language software application. The method 400 is performed by processing logic that may comprise hardware (circuitry, dedicated logic, etc.), software (such as is run on a general purpose computer system or a dedicated machine), firmware, or a combination. In one embodiment, the method 400 is performed by an interpreter 102 and concise expression class interpreter 108 of computing system 100 of FIG. 1.

Referring to FIG. 4, the process begins by processing logic executing an expression in an interpreted language software application (processing block 402). The expressions are instructions to an interpreter (e.g., interpreter 102 of FIG. 1) that, when executed by the interpreter, create the software application. Furthermore, because the expressions are interpreted, they are not subject to any pre-compilation prior to run time of the software application.

Objects in the expression are evaluated (processing block 404). Evaluation of the objects may include issuing method calls, accessing data, writing data, etc. When the data, method, or function associated with the object exists, the results of the evaluation are returned (processing block 406). In other words, the expression may be evaluated normally as all data and logic necessary to evaluate the expression are available within a software application.

Processing logic returns an instance of a concise expression class when the object does not exist (processing block 408). Based on the definition of the concise expression class, discussed above, the instance of the concise expression class is returned without execution of any test code for determination of the object's existence. That is, rather than receiving an execution error when an object does not exist, a useful object that does not do anything but includes all expected attributes is returned. Thus, expressions may be written for the interpreted language software application in a more natural manner that simplifies readability for software development, and simplifies interpretation.

Figure 5:
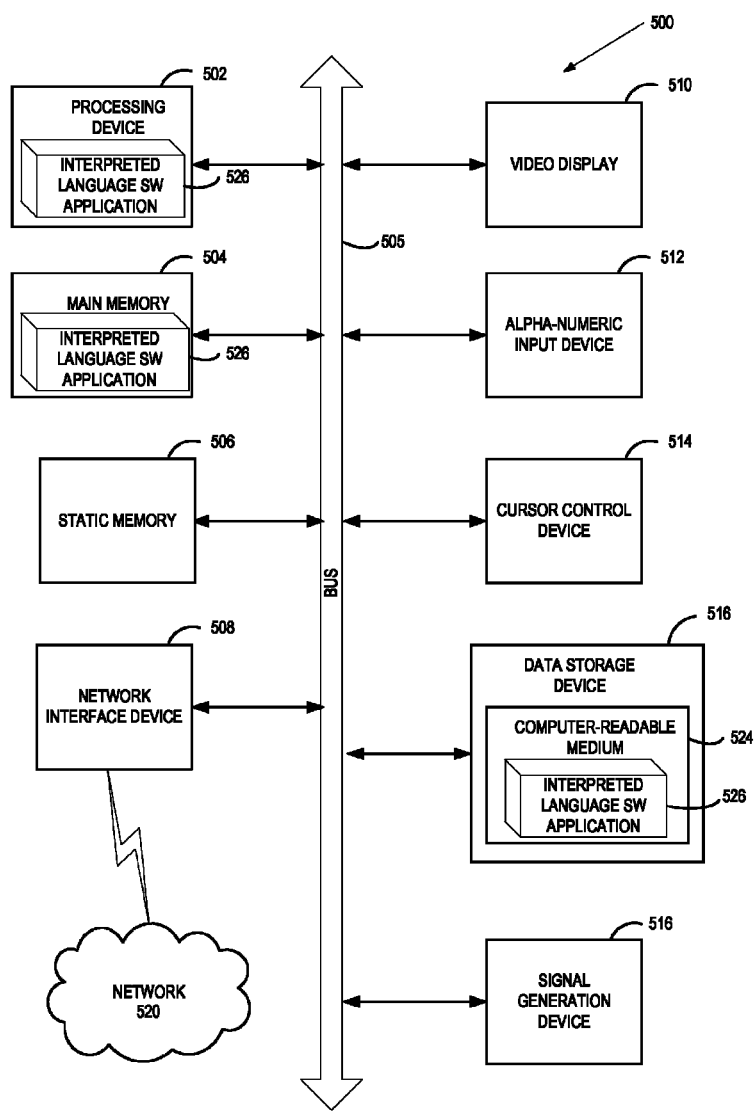
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer readable medium 524 on which is stored one or more sets of instructions (e.g., interpreted language software application 526) embodying any one or more of the methodologies or functions described herein. The interpreted language software application 526 may also reside, completely or at least partially, within the main memory 504 and/or within the processing device 502 during execution thereof by the computer system 500, the main memory 504 and the processing device 502 also constituting computer readable media. The interpreted language software application 526 may further be transmitted or received over a network 530 via the network interface device 522.

While the computer readable medium 524 is shown in an exemplary embodiment to be a single medium, the term "computer readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding or carrying a set of instructions for execution by the machine and that cause the machine to perform any one or more of the methodologies of the present invention. The term "computer readable medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "defining", "including", "executing", "returning" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer-implemented method comprising:
    defining a first class, the first class being a concise expression class that comprises one or more objects;
    including the concise expression class in a second class that comprises one or more objects of the second class;
    executing, by a processor, an expression in a software application to evaluate an object of the second class to determine whether data associated with the object of the second class exists;
    returning results of the execution of the expression when data associated with the object of the second class exists within the software application; and
    returning an instance of an object of the concise expression class when data associated with the object of the second class does not exist within the software application, wherein when the concise expression class comprises an attribute of the object of the second class, an attribute of the returned instance of the object of the concise expression class corresponds to the attribute of the object of the second class.

2. The computer-implemented method of claim 1, wherein the software application is an object oriented interpreted programming language software application.

3. The computer-implemented method of claim 1, wherein executing the expression comprises: executing the expression in the software application without execution of test code to determine whether data associated with the object of the second class exists.

4. The computer-implemented method of claim 1, wherein defining the concise expression class further comprises:
    defining a class-specific operator overloading for objects and methods within the concise expression class.

5. The computer-implemented method of claim 1, wherein execution of the expression to evaluate the object of the second class comprises issuing a method call.

6. The computer-implemented method of claim 1, wherein execution of the expression to evaluate the object of the second class comprises accessing data in an object outside of the second class.

7. A non-transitory computer readable storage medium that provides instructions, which when executed on a processing system cause the processing system to perform operations comprising:
    defining a first class, the first class being a concise expression class that comprises one or more objects;
    including the concise expression class in a second class that comprises one or more objects of the second class;
    executing an expression in a software application to evaluate an object of the second class to determine whether data associated with the object of the second class exists;
    returning results of the execution of the expression when data associated with the object of the second class exists within the software application; and
    returning an instance of an object of the concise expression class when data associated with the object of the second class does not exist within the software application, wherein when the concise expression class comprises an attribute of the object of the second class, an attribute of the returned instance of the object of the concise expression class corresponds to the attribute of the object of the second class.

8. The non-transitory computer readable storage medium of claim 7, wherein the software application is an object oriented interpreted programming language software application.

9. The non-transitory computer readable storage medium of claim 7, wherein executing the expression comprises: executing the expression in the software application without execution of test code to determine whether data associated with the object of the second class exists.

10. The non-transitory computer readable storage medium of claim 7, wherein defining the concise expression class further comprises: defining a class-specific operator overloading for objects and methods within the concise expression class.

11. The non-transitory computer readable storage medium of claim 7, wherein execution of the expression to evaluate the object of the second class comprises issuing a method call.

12. The non-transitory computer readable storage medium of claim 7, wherein execution of the expression to evaluate the object of the second class comprises accessing data in an object outside of the second class.

13. A system comprising:
    a memory; and
    a processing device coupled with the memory to
    execute an interpreted language software application to execute an expression in the interpreted language software application to evaluate an object of a first class that comprises one or more objects and an object of a second class, the second class being a concise expression class,
    execute the expression in the interpreted language software application to determine whether data associated with the object of the first class exists, return a result of the execution of the expression when data associated with the object of the first class exists within the software application, and return an instance of an object of the concise expression class when data associated with the object of the first class does not exist within the interpreted language software application, wherein when the concise expression class comprises an attribute of the object of the second class, an attribute of the returned instance of the object of the concise expression class corresponds to the attribute of the object of the second class.

14. The system of claim 13, wherein the interpreted language software application comprises an object oriented interpreted programming language software application.

15. The system of claim 13, wherein when the processing device defines the concise expression class, the processing device to define a class-specific operator overloading for objects and methods within the concise expression class.

16. The system of claim 13, wherein the processing device executes the expression in the interpreted language software application without execution of test code to determine whether data associated with the object of the second class exists.

17. The system of claim 13, wherein when the processing device executes the expression to evaluate the object of the second class, the processing device to issue a method call.

18. The system of claim 13, wherein when the processing device executes the expression to evaluate the object of the second class, the processing device to access data in an object outside of the second class.

* * * * *

UNITED STATES PATENT AND TRADEMARK OFFICE
CERTIFICATE OF CORRECTION

| | | |
|---|---|---|
| PATENT NO. | : 8,549,485 B2 | Page 1 of 1 |
| APPLICATION NO. | : 13/113005 | |
| DATED | : October 1, 2013 | |
| INVENTOR(S) | : Glauber de Oliveria Costa | |

It is certified that error appears in the above-identified patent and that said Letters Patent is hereby corrected as shown below:

On the Title page, Item (54) and in the Specification, column 1, lines 1-3, Title of Invention:

"METHOD AND SYSTEM FOR CONCISE EXPRESSION OF OPTIONAL CODE SNIPPETS IN INTERREPTED LANGUAGES"

should be

"METHOD AND SYSTEM FOR CONCISE EXPRESSION OF OPTIONAL CODE SNIPPETS IN INTERPRETED LANGUAGES"

Signed and Sealed this
Twenty-second Day of April, 2014

Michelle K. Lee
*Deputy Director of the United States Patent and Trademark Office*